Figure 2:
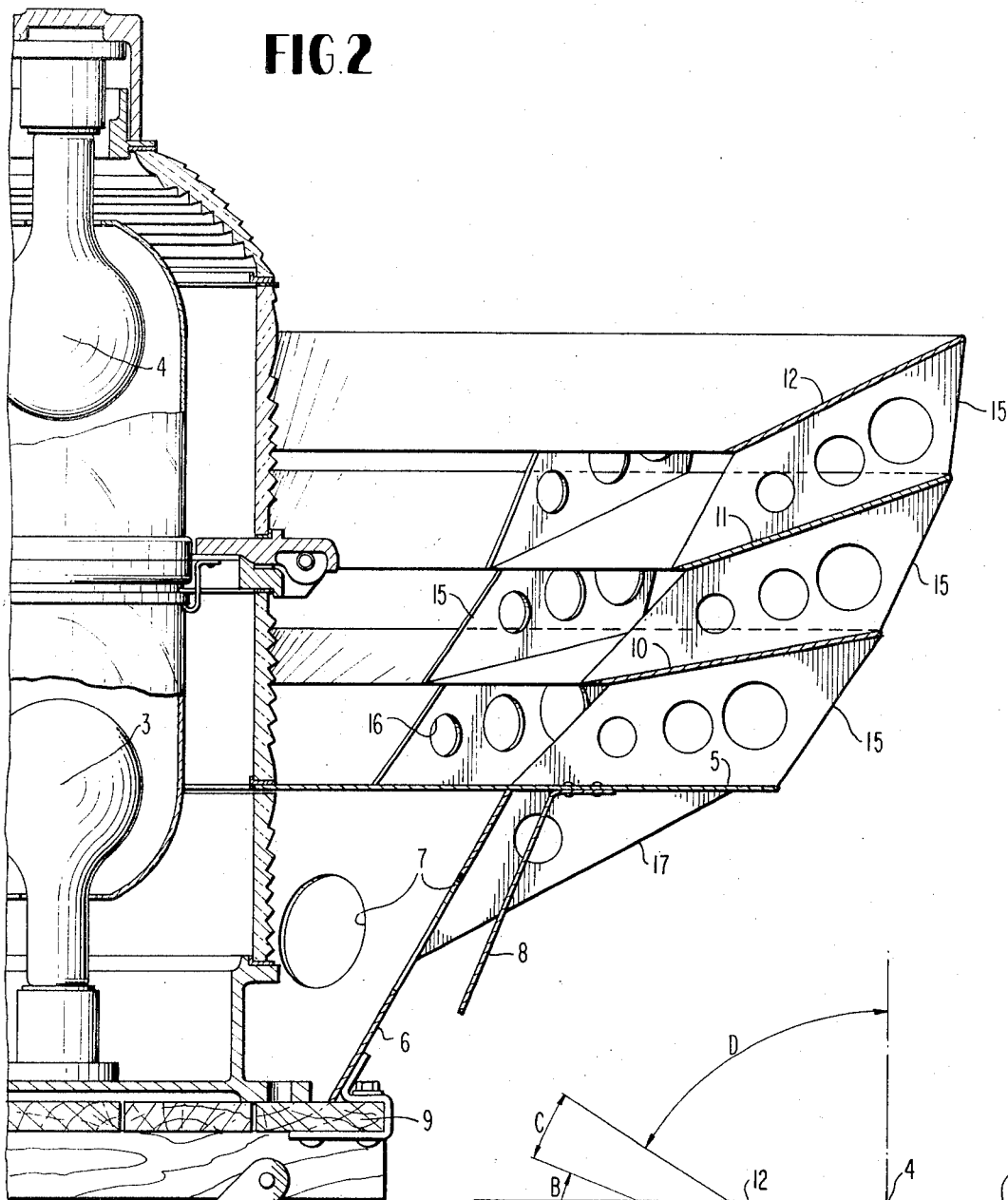

United States Patent [19]
Hitchcock

[11] 3,858,041
[45] Dec. 31, 1974

[54] HAZARD LIGHT SHIELD
[75] Inventor: Richard M. Hitchcock, Springfield, Vt.
[73] Assignee: Dufresne-Henry Engineering Corporation, North Springfield, Vt.
[22] Filed: Jan. 28, 1974
[21] Appl. No.: 437,289

[52] U.S. Cl. ................ 240/46.53, 240/1.2, 240/22, 340/25
[51] Int. Cl. ............................................ F21v 11/16
[58] Field of Search ............ 240/46.53, 1.2, 22, 23, 240/24; 340/25, 26

[56] References Cited
UNITED STATES PATENTS
1,941,503  1/1934  Villiers............................ 240/1.2 X
3,138,779  6/1964  Murray et al. .................... 240/1.2 X
3,634,675  1/1972  Madsen............................... 240/1.2
3,737,645  6/1973  Kearsley .......................... 240/1.2 X

*Primary Examiner*—Richard L. Moses
*Attorney, Agent, or Firm*—Whitcomb, Clark & Moeser

[57] ABSTRACT

A light shield which can be attached to aircraft warning lights normally used on hills and high objects such as antennas. The shield is so constructed as to obscure the lights from the view of persons on the ground, yet leaving the lights fully visible as warnings to pilots of aircraft.

3 Claims, 2 Drawing Figures

PATENTED DEC 31 1974  3,858,041

HAZARD LIGHT SHIELD

My invention relates to hazard beacons for airports and relates more particularly to a shield device to mask the warning light of such a beacon from all observers other than those for whom it is intended.

The growing use of air travel has led to the (necessary) proliferation of flashing warning lights to identify high obstacles, whether man made structures or natural hazards like hills. Such obstacles often present dangers to aircraft flying at low altitudes, as when coming into or departing from an airport.

While these lights are necessary to promote safety, they are often a nuisance, particularly in populated areas where the inhabitants are subjected to the periodic flashing of the familiar red warning lights. I propose to completely mask such lights from view to any one below a selected horizontal plane without limiting in any way the effectiveness of such lights when viewed by occupants of aircraft positioned above said plane.

To make such a device effective, several difficulties must be overcome. First, the lights must be in pairs for reliability. Second, while a large horizontal disk could be envisioned to screen the light by positioning it just below the light source, such a disk would have to be enormous to be an effective screen. Furthermore, if the pair of lights is positioned one above the other (as is usual) no one selected plane could possible screen both lights to an observer on the ground. A plane at the top light would leave the bottom light exposed; a plane at the bottom light could not occlude the top light except for a limited area just below it.

An effective device for these purposes must be of reasonable size and fairly light in weight, as it must be supported on the tower carrying the beacon lights. It must also be of such construction as to withstand the considerable wind pressures and other vicissitudes of weather to which it would be subjected.

Figure 1:
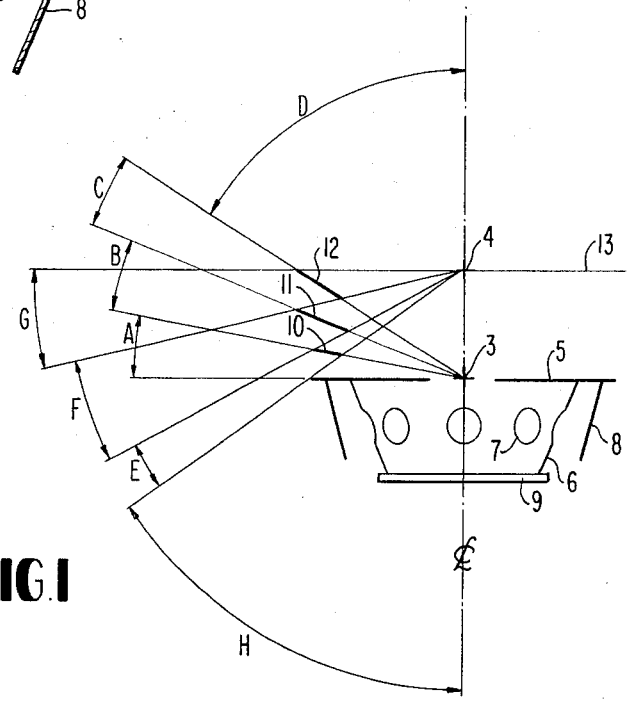

I have solved the foregoing problems with a new structure which can be best understood from the following detailed description and the accompany drawings, in which FIG. 1 is a geometrical schematic representation of my device illustrating the principles upon which the invention is based; and FIG. 2 is a view partly in section showing how the component parts of the shield are assembled for the purposes herein set forth.

Referring now more particularly to FIG. 1, I represent two flashing warning lights as essential point sources 3 and 4. In the commercial model with which experiments were performed, these sources (filaments) were 13 inches apart. Both light sources are operated and flash intermittently. The two lights assure the high probability of continuous warning even though one of them might fail.

In the horizontal plane passing through source 3, I provide a disk 5 and a skirt 6. The skirt has a series of apertures (I used eight) to minimize wind resistance. Each such aperture 6 has a fin 8 positioned in front of it to prevent light reaching the ground from source 3. It should be noted here that the entire assembly is mounted on a platform 9 which is opaque. Thus light source 3 cannot be seen from any point below the plane of disk 5.

If the source 4 were to be masked in the same way, then source 3, of course, could not be seen above the plane of disk 5 either. I therefore provide a series of louvres, designated 10, 11, and 12; these louvres are concentric and their surfaces comprise sections of regular cones having a common axis along the center line of the device. The louvres are so positioned that radial lines which are extensions of each louvre surface all pass through source 3. Thus no louvred surface shields any light from source 3 above the plane of the disk 5. An observer anywhere in Zones A, B, C, or D will be able to see the light from source 3. The louvres 10, 11, and 12 are concentric rings with their respective diameters and cone angles so chosen as to create zones of occlusion for light source 4 for all observers below the plane 13. Thus Zones E, F, and G are in total shadow with respect to light source 4. Zone H is also occluded (from both sources) and Zone D is illuminated by both sources. I have shown these respective zones on one side of the center line, but it will be appreciated that in three dimensions these zones represent volumes of revolution around the two light sources. To summarize the geometry from FIG. 1, neither one of the two sources 3 and 4 can be seen below the plane of disk 5; both sources 3 and 4 can be seen above the plane 13; and in the thirteen inch horizontal zone defined by disk 5 and the plane 13, source 3 can be seen. This limitation is deemed to be of no significance because as a practical matter the device is fully effective as a warning (both lights operative) above plane 13 and fully masked (both lights occluded) in the plane of disk 5 only a few inches (in one case 13 inches) below.

The louvres and other elements shown schematically in FIG. 1 and described functionally, are mounted in proper spatial relationship as best shown in FIG. 2. Between the louvres I place a series of supporting fins 15. Each such fin lies in a vertical plane passing through the center line of my device. A plurality of such fins (I used eight, one every 45°) are provided to support the louvres. The fin 15 between louvre 10 and disk 5 connects the entire concentric louvre structure to the disk 5 which rests on the skirt 6 affixed to the base platform 9. Each louvre above louvre 10 is supported on the lower one by a similar series of fins 15. I found it advisable to form a number of holes in each fin to reduce windage effects without seriously affecting structural integrity. Two series of fins 15 are shown in FIG. 2, one set in elevation and a second set in perspective. It will be appreciated that with a set provided every 45° (the number is not critical) a very rigid structure of concentric, spaced louvres is obtained. Since the fins lie in radial planes, they do not interfere in any significant way with the illumination of Zones A, B, and C by light source 3.

To stiffen the disk 5, which extends somewhat beyond the diameter of the skirt 6, I use a series of triangular braces 17.

While I have shown one preferred embodiment of my invention, it can be seen that variations in design — number of louvres, spacing thereof, and the like — are possible. The important considerations are low weight and openness of a design, which while maintaining rigidity, reduces the wind pressure to which such an installation is usually subjected. My device has proven very effective under actual field conditions. The hazard lights have performed fully their intended function without impinging on observers for whom the lights perform no service and to whom they are therefore objectionable.

I claim:

1. A shield for a pair of hazard lights spaced on a vertical axis, comprising an opaque disk in a horizontal plane at the lower of said lights, and a series of circular louvres which are conic sections concentric with said axis and arranged in the zone between said plane and a parallel plane passing through the upper one of said lights, the surface of each of said louvres being aligned with all of the radial lines passing through the point represented by said lower light at a given angle to said axis.

2. A shield according to claim 1 in which said louvres are held in their predetermined spatial positions by a series of supporting fins therebetween, the plane of each fin lying in a plane passing through said axis.

3. A shield according to claim 2 in which said fins have apertures to reduce the wind resistance of the assembly.

* * * * *